A. A. SHAFFER 3,549,244

PRECISION PRISM OSCILLATING MECHANISM

Filed Jan. 27, 1969

INVENTOR
ALLEN A. SHAFFER

BY

ATTORNEY

Dec. 22, 1970  A. A. SHAFFER  3,549,244

PRECISION PRISM OSCILLATING MECHANISM

Filed Jan. 27, 1969  3 Sheets-Sheet 2

INVENTOR
ALLEN A. SHAFFER

BY

ATTORNEY

Dec. 22, 1970     A. A. SHAFFER     3,549,244
PRECISION PRISM OSCILLATING MECHANISM
Filed Jan. 27, 1969     3 Sheets-Sheet 3

INVENTOR
ALLEN A. SHAFFER

BY

ATTORNEY

United States Patent Office 3,549,244
Patented Dec. 22, 1970

3,549,244
PRECISION PRISM OSCILLATING MECHANISM
Allen A. Shaffer, Dallas, Tex., assignor, by mesne assignments, to the United States of America as represented by the Secretary of the Navy
Filed Jan. 27, 1969, Ser. No. 794,294
Int. Cl. G02b 7/18
U.S. Cl. 350—287                          9 Claims

ABSTRACT OF THE DISCLOSURE

A prism mount which allows rotation of the prism about one axis with a sensitivity of less than one arc second. The prism has four support points and each support point consists of two tension bands wrapped around a post in opposite directions with each tension band being attached to the prism at one end and to a supporting base at the other end. A voice coil solenoid is arranged to exert a torque on the post, thereby changing the tension balance of the bands to cause the prism to rotate.

---

The present invention relates to a system for selectively rotating an optical element, and more particularly pertains to a system for precisely rotating a prism about one axis while accurately maintaining the original orientation of the prism relative to the remaining two axes. When optically aligning a gyroscope relative to some standard coordinate system, it is necessary to precisely rotate an aligning prism about one of its axes with an accuracy of much less than one arc second without disturbing the alignment of the prism about the remaining two axes. An optical alignment system for a gyroscope as described above is disclosed in U.S. patent application 349,454, filed Mar. 4, 1964, for "Optical Instrument for Determining the Parallelism or Non-Parallelism of Two Reflecting Surfaces." The disclosed invention provides the necessary precision by supporting the optical element with tension bands, with the relative tension balance between the bands being controlled to selectively rotate the element.

In the field of optics it has been the general practice to support the optical element directly as by ball bearings or indirectly as by torsional wires. These supports proved unsatisfactory in that they either subject the element to rotational frictional or were unstable, and very fine rotational adjustments were difficult to obtain. Also, rotation about one axis often adversely disturbed the orientation of the optical instrument about the remaining two axes.

The general purpose of this invention is to provide an element with a rotational support which is very stable, has no bearing or sliding friction and which allows a rotational movement of ±5 arc minutes with a sensitivity of rotation considerably less than one arc second. Another object of this invention is to provide a rotational support for an object which allows precise rotation of the object about one axis without disturbing the exact orientation of the object about the remaining two axes. This is accomplished by supporting the element by tension bands which provide vertical support for the element and allow frictionless precise rotational movement about one axis without undesired rotation about the remaining two axes.

Figure 1:
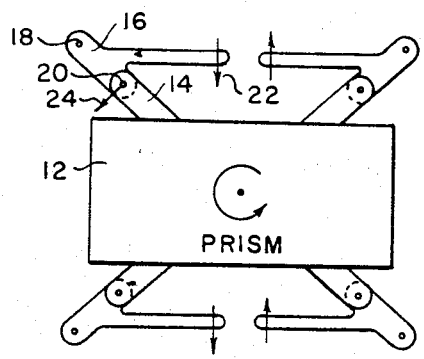
FIG. 1 shows a schematic of a pin link equivalent of the tension band support.

Referring to FIG. 1, there is shown a schematic of the flexure pivot using the pin link equivalent of the tension band support. A prism 12 is supported at each of four locations by a first link 14 which pivots about a second link 16. A force in the direction of arrow 22 on the second link 16 will cause rotation of that link about point 18, thereby moving the first link 14 in the direction of arrow 24. Actuation of all four link supports by a force as illustrated by arrow 22 will cause the prism to rotate in a counterclockwise direction.

Figure 2:
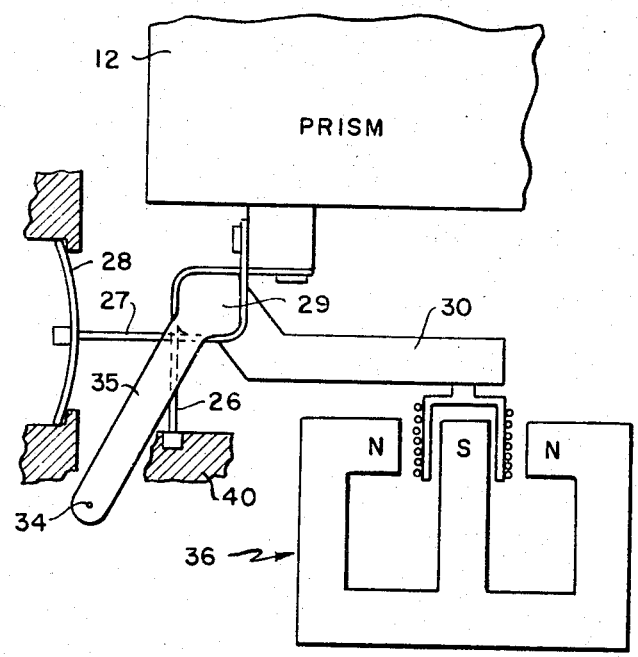
FIG. 2 illustrates a schematic presentation of one tension band pivot point.

Referring to FIG. 2, there is shown a schematic illustration of one of the four tension band pivot points of the prism 12. One corner of the prism 12 is supported by two tension bands 26 and 27 which extend from the prism at 90° to one another and are then wrapped in opposite directions around a generally square post 29. The tension bands may be constructed of a material such as a soft spring steel which is strong enough to support the prism, and yet flexible enough to bend easily. Tension band 26 terminates in a firm mounting on base 40, while tension band 27 is mounted on flexible beam 28 which serves to keep both bands under constant tension. Post 29 pivots generally about point 34 via a fulcrum 35. A solenoid mechanism 36 is attached to post 29 via arm 30, and provides the moving force to pivot post 29 about point 34. Actuation of solenoid 36 causes the arm 30, post 29 and fulcrum 35 to pivot generally about point 34, thus changing the tension balance in tension bands 26 and 27 and causing rotation of the prism 12.

Figure 3:
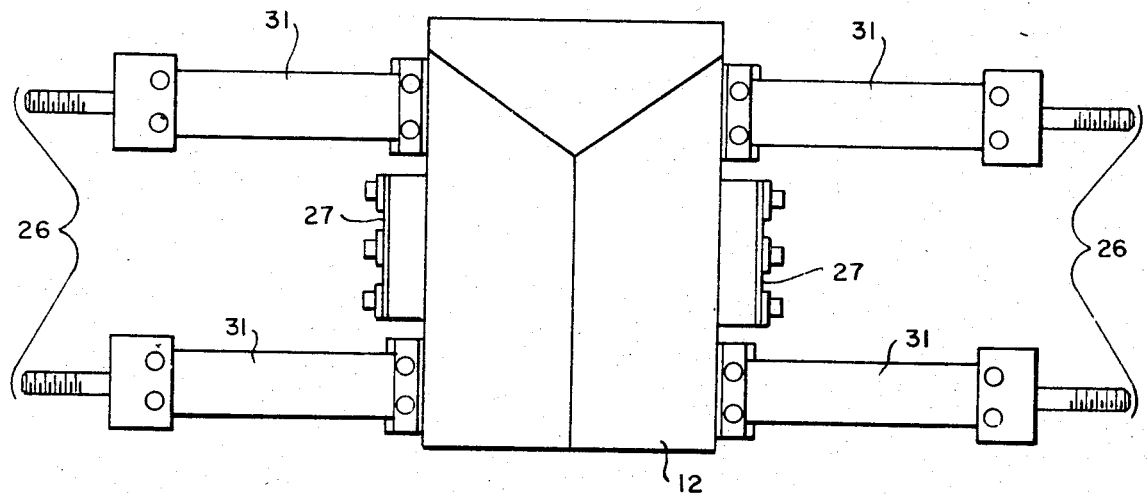
FIG. 3 is a front view of the prism showing the mounting of the tension bands.

FIG. 3 illustrates a front view of the prism in the preferred embodiment. Two tension bands 26 are shown mounted on two support points of the prism 12. Each tension band 26 is composed of two tension band portions 31. The ends of the tension band portions furthest from the prism terminate in threaded couplings. Tension bands 27 extend perpendicular to bands 26 and out from the plane of the drawing such that an end view is visible in FIG. 3.

Figure 4:
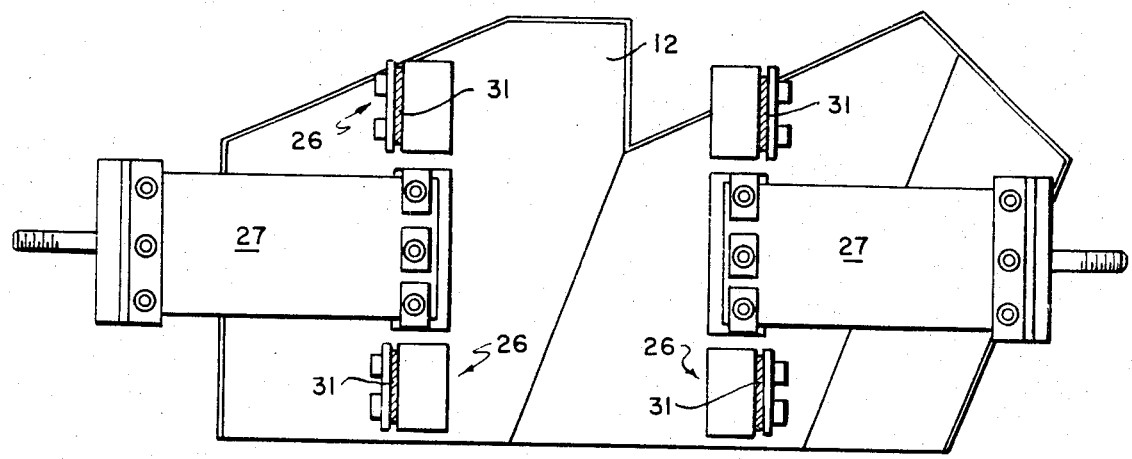
FIG. 4 is a side view of the prism showing the mounting of the tension bands.

Referring to FIG. 4, there is illustrated a side view of the prism 12 with tension bands 27 mounted perpendicular to the tension bands 26 and between the two tension band portions 31 which comprise each tension band 26. In this view the tension bands 26 extend out from the plane of the drawing.

Figure 5:
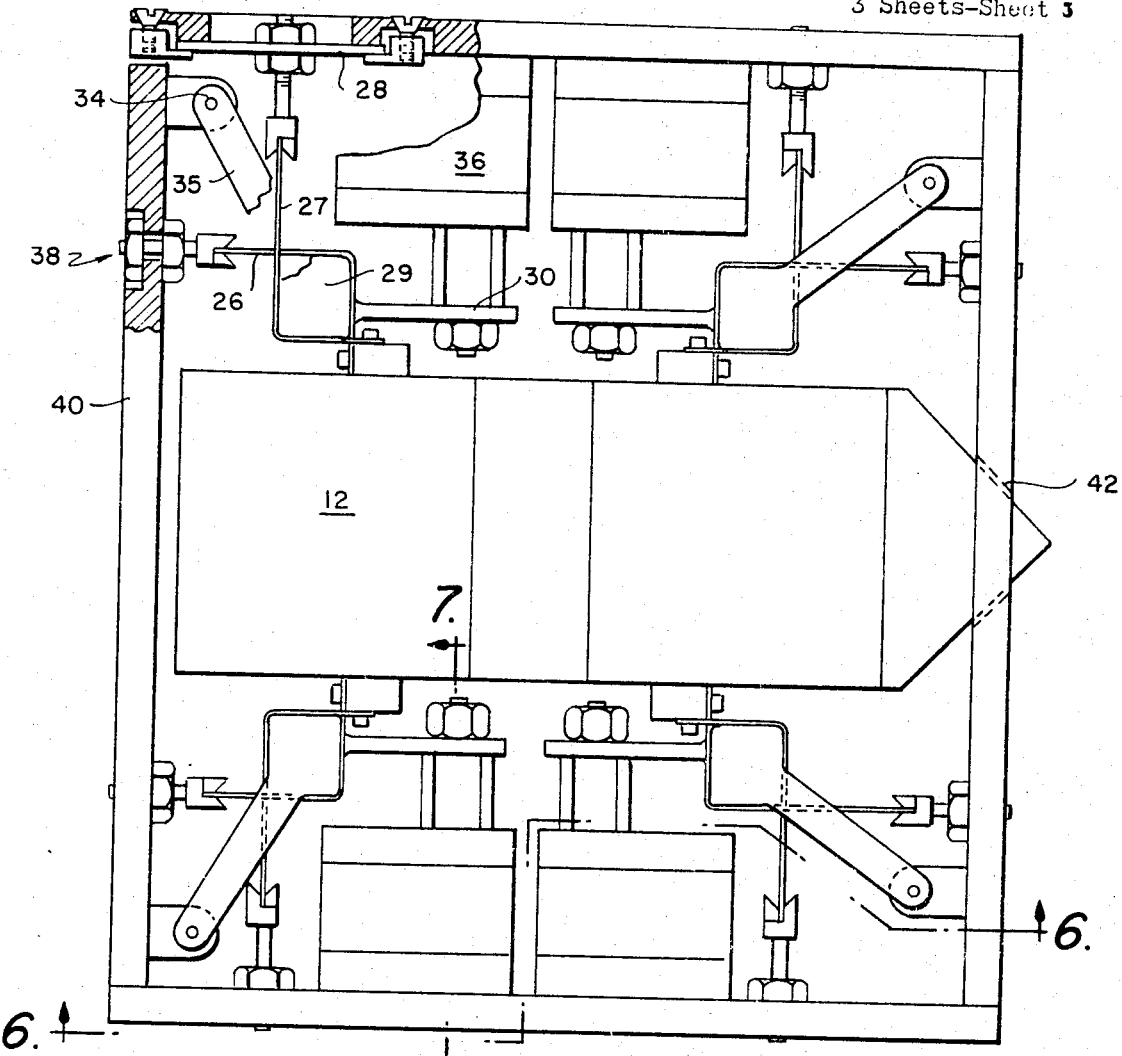
FIG. 5 is a top view of the prism in a housing showing the four tension band pivot points supporting the prism in the housing.

FIG. 5 is a top view of the preferred embodiment of the invention. The prism 12 is mounted on a base which is shown as housing 40, with the front of the prism protruding from an aperture in the housing at 42. The prism is supported by four tension band pivot points, and is rotated by simultaneously actuating all four pivot points in unison. One pivot point will be explained and this is illustrative of the remaining three support points. The pivot point support for the prism 12 consists of two tension bands 26 and 27 which extend from the prism at 90° to one another and are then wrapped in opposite directions about post 29. Tension band 26 terminates in a fixed mounting 38 on base 40, while the end of tension band 27 is flexibly mounted on flexible beam 28, which serves to keep both bands under constant tension. Post 29 pivots generally about pivot 34 via a fulcrum 35, which is shown in section. Solenoid 36 is connected to post 29 via arm 30, and actuation of it causes arm 30, post 29 and fulcrum 35 to pivot generally about point 34, thus changing the tension balance in the bands and causing rotation of the prism.

Figure 6:
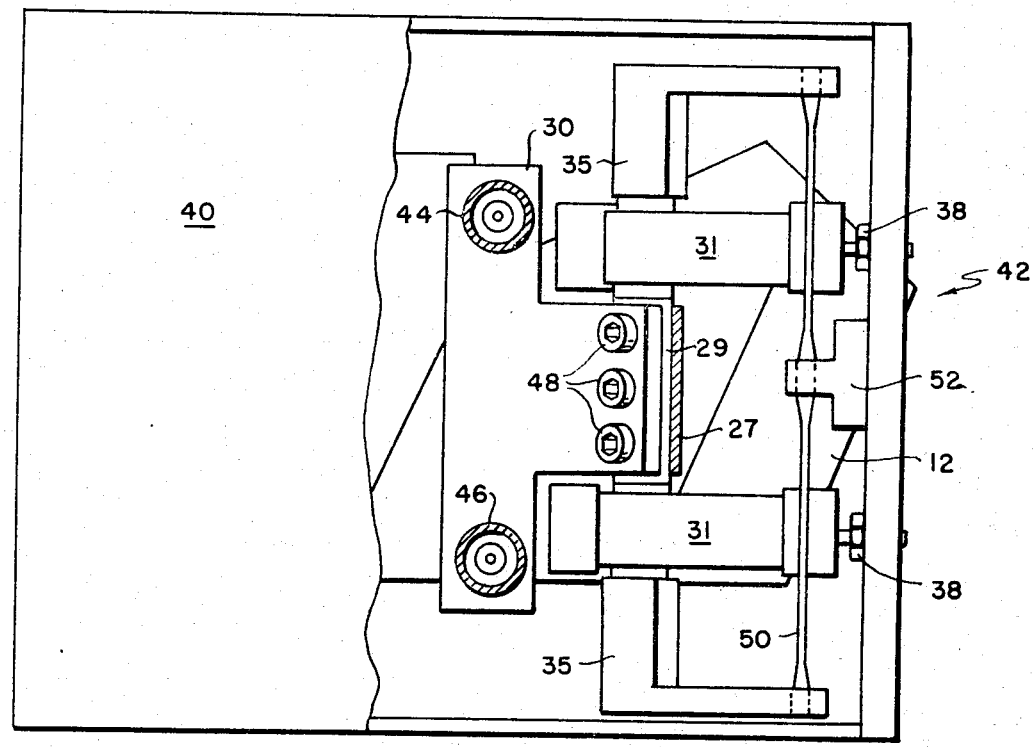
FIG. 6 is a partially sectioned side view of the housing shown in FIG. 5 and illustrates further detail of one tension band pivot point.

FIG. 6, a partially sectional side view of housing 40, shows more details of one pivot point. Tension band portions 31 are rigidly mounted at 38 and a cross-sectional view of tension band 27 is visible. Arm 30 is attached to post 29 by three screws 48, and is subject to actuation by two voice coil solenoids 44 and 46, each shown in section. Post 29 has fulcrum pieces 35 mounted at its top and bottom. Fulcrum pieces 35 pivot about flexible mount 50 which is supported by a base piece 52 as illustrated. Flexible mount 50 allows some lateral flexing of fulcrum pieces 35 in addition to the purely rotational movement of the fulcrum pieces.

Figure 7:
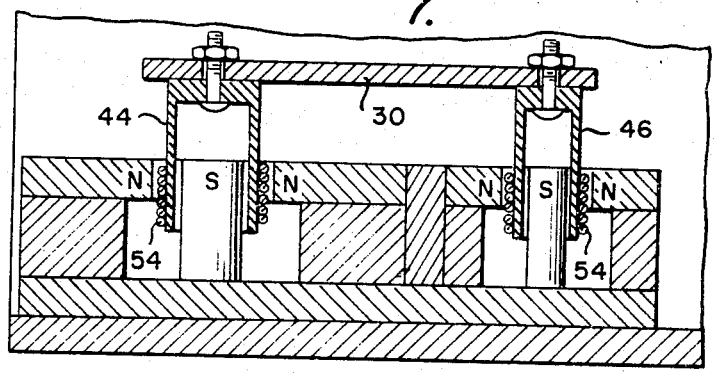
FIG. 7 is a sectional view of FIG. 5 showing details of the voice coil solenoid.

FIG. 7 is a sectional view of FIG. 5 showing the solenoid 36 in section. Arm 30 is rigidly mounted on solenoid cylinders 44 and 46, each having coil windings 54. Each cylinder and winding is in a magnetic circuit as is conventional in the art. Actuation of the tension band pivot point is accomplished by simultaneously running current through each of the coils 54, with the direction of rotation of the pivot point being determined by the direction of the current. The cylinders 44 and 46 are illustrated in the preferred embodiment as being of different diameters, but this is a design feature, and the two cylinders might be made the same diameter, or alternately only one cylinder and winding may be used at each tension band pivot point. As another alternative, one solenoid cylinder such as 44 might be used as a driving mechanism while the second winding on cylinder 46 is used as a pickoff mechanism, thus allowing feed back to check the accuracy of the rotational movement.

The preferred embodiment illustrates a prism as being the object subject to rotation, but the tension band support of the present invention may be applied to any object which requires precise rotational movement without frictional interference. Also, the preferred embodiment has four tension band pivot points, but the number of tension band pivot points may be either less or greater, depending upon the particular application.

The invention discloses a rotational support for an element which is very stable, has no bearing or sliding friction and which allows a sensitivity of rotation considerably less than one arc second.

Obviously, many modifications and variations of the present invention are possible in the light of the above teachings. It is therefore, to be understood that, within the scope of the appended claims, the invention may be practiced otherwise than as specifically described.

I claim:
1. A flexural pivot support for an object subject to precise rotation comprising:
an object adapted to be precisely rotated about one axis;
a base adapted to mount said object;
at least one tension band pivot point supporting said object on said base;
each pivot point having a first tension band and a second tension band, said tension bands having one end supporting said object and the other end mounted on said base and adapted to rotate the object when the tension balance between the two bands is changed; and
each pivot point also having a post with the first and second tension bands wrapped around the post in opposite directions and the post being subject to positional movement thereby altering the tension balance and rotating said object.

2. A flexural pivot support as recited in claim 1 wherein said second tension band consists of two band portions with each of the band portions fitting on opposite sides of the first tension band.

3. A flexural pivot support as recited in claim 1 wherein said second tension band consists of two band portions with one of the band portions wrapped around said post above the first tension band and the other band portion wrapped around said post below said first tension band.

4. A flexural pivot support as recited in claim 3 wherein the other end of said second tension band is firmly supported on said base and a flexible beam mounts said other end of said first tension band on said base and serves to keep the tension band pivot point under constant tension.

5. A flexural pivot support as recited in claim 4 wherein a fulcrum is attached to said post at one end of the fulcrum thereby allowing rotation of the post generally around the other end of the fulcrum.

6. A flexural pivot support as recited in claim 5 wherein a flexible base supports said other end of the fulcrum thereby allowing a certain amount of lateral movement of the fulcrum along with rotative movement of the fulcrum.

7. A flexural pivot support as recited in claim 5 wherein an arm has one end attached to said post and extends from said post in a direction generally opposite from said fulcrum and, a voice coil solenoid is attached to the other end of said arm, whereby actuation of said voice coil solenoid causes rotation of said arm, post and fulcrum generally about said other end of the fulcrum thereby changing the tension balance in the bands and causing rotation of the object.

8. A flexural pivot support as recited in claim 7 wherein said voice coil solenoid comprises a first cylindrical member having a voice coil wrapped around it and a second cylindrical member having a voice coil wrapped around it, each cylindrical member having a magnetic circuit cooperating therewith, and said second cylindrical member being of a different diameter than said first cylindrical member.

9. A flexural pivot support as recited in claim 8 wherein said object is a prism and, said prism is supported by four tension band pivot points generally equally spaced around said prism, whereby current through each solenoid actuates a respective arm, post and fulcrum to pivot generally about said other end of each fulcrum thereby changing the tension balance in the tension bands at each of the four tension band pivot points to precisely rotate the prism.

References Cited
UNITED STATES PATENTS 2,920,529   1/1960   Blythe.
3,156,759   11/1964  Collen.

DAVID SCHONBERG, Primary Examiner

M. J. TOKAR, Assistant Examiner

U.S. Cl. X.R.

74—89, 96; 250—231; 267—160; 350—6